United States Patent Office 3,054,775
Patented Sept. 18, 1962

3,054,775
POLYMERIZATION OF FORMALDEHYDE BY NICKEL-PHOSPHINE COMPLEXES
William Hodes, Rahway, N.J., and Lewis S. Meriwether, Norwalk, Conn., assignors to American Cyanamid Company, New York, N.Y., a corporation of Maine
No Drawing. Filed Feb. 24, 1961, Ser. No. 91,321
3 Claims. (Cl. 260—67)

This invention relates to the production of high molecular weight, unbranched polyformaldehyde. Moreover, this invention relates to a new and novel process for the polymerization of formaldehyde. More particularly, this invention relates to a process for the polymerization of formaldehyde utilizing a new catalyst therefor.

It has now been found that the complex of nickel chloride and tri-n-butylphosphine is a particularly useful catalyst for the polymerization of formaldehyde.

It is an object of the instant invention to provide a new process for the polymerization of formaldehyde. It is a further object of this invention to provide a new catalyst for the polymerization of formaldehyde. These and other objects will become obvious in view of the more detailed discussion presented hereinbelow.

The process of the instant invention comprises contacting substantially pure formaldehyde with the complex of nickel chloride and tri-n-butylphosphine and allowing the formaldehyde to polymerize by addition polymerization to a polymer of formaldehyde. The complex used as catalyst can be represented by the following formula $$Ni(Bu_3P)_2Cl_2$$

and will be referred to hereinafter as bis(tri-n-butylphosphine)nickel dichloride. This complex can be prepared as follows:

12 parts of anhydrous $NiCl_2$ are dissolved in 150 parts of absolute ethanol. To this solution are added 40 parts of tri-n-butylphosphine. The resulting solution is mixed and a red color immediately appears. The red solution is stirred further on an ice bath for 2 hours, under prepurified nitrogen, and the mixture is allowed to stand 15 to 18 hours in a freezer at —30° C. in a closed vessel. Brillant red, platelike crystals then form and are filtered off and washed with 2 parts of absolute ethanol.

The bis(tri-n-butylphosphine)nickel dichloride recovered had an M.P. of 47–48° C.

The new catalyst is a convenient and useful equivalent for the catalysts previously used for the polymerization of formaldehyde in the prior art and possesses the advantage that it is easier to handle and store than many of the previously reported catalysts.

Among those catalysts previously reported as being effective for the polymerization of formaldehyde are those disclosed by MacDonald in U.S. Patents 2,734,889, 2,828,286 and 2,841,570 and in British Patent 770,717. These patents disclose the use of such compounds as the carbonyls of group VIII metals such as nickel, iron and cobalt, as well as various phosphines, arsines and stibenes such as triphenylphosphine, dimethylphenylarsine, methyldioctylstibene and the like. Various amines such as ethyl, butyl, octyl, decyl, dodecyl, octadecyl amines, dibutylamine, cyclohexylamine, decahydronaphthylamine, aniline, hydrazines, morpholines, and the like were also shown.

Various complexes of these compounds have also been utilized. The complexes include bis(tri-n-butylphosphine)nickel dicarbonyl $[Ni(CO)_2(Bu_3P)_2]$ and bis(triphenylphosphine)nickel dicarbonyl $N:(CO)_2$  $[(phenyl)_3P]_2$.

The phosphines are a group of very unstable compounds, decomposing readily upon contact with the air, however, the bis(tri-n-butylphosphine)nickel dichloride of the present invention is a very stable compound and can be stored indefinitely in contact with the air, and therefor presents a much more attractive catalyst for the polymerization of formaldehyde.

We have found that bis(tri-n-butylphosphine)nickel dichloride not only is easier to handle and store than the catalysts of the prior art but also results in the production of a higher yield of polyformaldehyde, as can be seen from Table I which follows.

TABLE I.—POLYMERIZATION OF FORMALDEHYDE

*System of 90 parts n-heptane, 0.01 part phenyl α-naphthylamine and 0.02 part catalyst*

| Catalyst | Temp. (° C.) | Time (hrs.) | Polymer (Parts) | Yield (percent) |
|---|---|---|---|---|
| $Ni(CO)_2[(phenyl)_3P]_2$ | −80° C. | 1 | trace | |
| $Ni(CO)_2(Bu_3P)_2$ | −80° C. | 2 | 0.63 | 6.5 |
| $Ni(phenyl PCl_2)_4$ | −80° C. | 4 | 0.0 | |
| $Ni(Bu_3P)_2Cl_2$ | −80° C. | 2 | 4.6 | 47 |

It can be seen from Table I that three of the catalysts did not result in a substantial yield of polymer while the catalyst of the instant invention resulted in the production of about seven times as much polymer as the next best catalyst.

The following example is by way of illustration only and is by no means meant to be construed as a limitation of the instant invention. All parts and percentages are by weight unless otherwise indicated.

EXAMPLE 1

Formaldehyde vapor is generated by heating α-polyoxymethylene at 120–150° C. and passed through a cold trap three times at −20° to 0° C. and then into a suitable reaction vessel. The reaction vessel is equipped with a stirrer, Dry Ice condenser (which leads to drying tubes, liquid air seals and vacuum), inlet tubes for nitrogen gas, formaldehyde gas and catalyst. The reaction vessel is thoroughly freed of air and filled with nitrogen. The reaction medium in the reaction vessel consists of a thoroughly agitated mixture of dry n-heptane, 0.01 part of phenyl-β-naphthylamine (as an antioxidant) and nitrogen gas at −80° C. and into this medium is added the purified formaldehyde. If no condensation to branched unstable polymer occurs, which indicates freedom from active impurities, the catalyst solution of 0.02 part of bis(tri-n-butylphosphine)nickel dichloride in 10 parts of heptane is gradually added. After complete addition of catalyst, the medium is allowed to stand for 3–6 hours. The polymer is then rapidly filtered off, washed with heptane, and then acetone and vacuum dried. The dry polyformaldehyde is then acetylated with excess, pure acetic anhydride and pyridine (in a ratio of 2 parts to 1) at a reflux tmeperature of 130° C. under nitrogen. The polymer is then washed thoroughly with acetone and dried until free of odor.

The process of the instant invention may be carried out in the presence or the absence of the liquid reaction medium or in a vapor phase reaction. The reaction medium can be any liquid which is inert to the starting materials and to the polyformaldehyde. Suitable reaction media are the hydrocarbons such as aliphatic, cycloaliphatic, and aromatic materials. Those media which are preferred are the aliphatic hydrocarbons of 3–12 carbon atoms such as propane, butane, pentane, hexane, heptane, octane, nonane, decane and dodecane.

The conditions of pressure and temperature of the reaction are not critical. Generally a temperature range of −100° C. to 100° C. may be used, but a range of −80° C. to 25° C. is preferred. The pressure utilized is preferably atmospheric but subatmospheric and superatmospheric pressures may also be used.

The formaldehyde monomer used can be derived from any source; however, the formaldehyde should be substantially pure prior to polymerization. Sources of formaldehyde include paraformaldehyde, α-polyoxymethylene and the like. If the formaldehyde is not substantially pure there is a danger of condensation of the monomer before the addition of the catalyst. By "substantially pure" is meant primarily, that the formaldehyde be substantially anhydrous, that is, containing less than 0.5% by weight of water and preferably less than 0.1% by weight of water. The use of cold traps, as set forth in the example above, is to insure the final purification of the formaldehyde with respect to its water content.

The amount of starting materials is not critical in this process. The weight ratio of monomer to reaction medium, if used, may vary from about 1:1 to about 1:1000, depending upon the intensity of the slurry desired. It is preferred, however, that about 4 to 100 parts of reaction medium per part of formaldehyde be used.

As mentioned above, the catalyst utilized in the instant invention is bis(tri-n-butylphosphine)nickel dichloride. The amount of catalyst used also is not critical. Small amounts or large amounts of catalyst have not caused any adverse effect on the reaction. However, we have found that the catalyst concentration advantageously should vary from about 0.00001 to about 0.002 weight percent of the reaction medium, when the reaction medium is used in quantities as recommended above. When utilizing a vapor phase reaction system, the same range of catalyst concentration can also be advantageously utilized. It is again stressed, however, that more than 0.002 weight percent can be used in either instance. Although the catalyst may be added in undissolved form, it is preferably added to the formaldehyde in solution in an inert solvent, which is preferably the same as the reaction medium in which the formaldehyde is polymerized. The rate of addition of the catalyst is preferably controlled so that the temperature of the reaction mixture, upon addition of the catalyst, does not exceed the range selected for the reaction.

There is no criticality in respect to the sequence of the addition of the materials to the reaction vessel but it is preferred that the formaldehyde be added to the reaction medium before the catalyst so as to discover if any undesirable condensation takes place, as mentioned above.

The process of the instant invention may include the use of various antioxidants, as shown in the example, dispersants, or other features which might occur to a skilled chemist.

Polymers made by the process of this invention are useful in the preparation of films, fibers, filaments, or molding compositions.

The best results from the standpoint of yield, are obtained when the polymerization is effected under non-oxidizing conditions. This is achieved by sweeping out the reaction vessel with an inert gas such as nitrogen. Carbon monoxide is also useful for this purpose. This is also the reason for the addition of an antioxidant, as mentioned above.

Although the example has illustrated a batch operation, it is understood that the process of the instant invention can be conducted as a continuous or semi-continuous operation without detracting from the optimum aspects thereof.

We claim:

1. A process for polymerizing formaldehyde comprising contacting substantially anhydrous monomeric formaldehyde with bis(tri-n-butylphosphine)nickel dichloride and recovering a high molecular weight polymer of formaldehyde.

2. The process of preparing a high molecular weight polymer of formaldehyde comprising contacting substantially anhydrous monomeric formaldehyde at a temperature of from about $-100°$ C. to about $100°$ C. with bis(tri-n-butylphosphine)nickel dischloride.

3. A process for the preparation of a high molecular weight polymer of formaldehyde which comprises introducing a substantially anhydrous monomer of formaldehyde into a reaction medium of an inert liquid aliphatic hydrocarbon of 3–12 carbon atoms per molecule, in the presence of bis(tri-n-butylphosphine)nickel dichloride, at a temperature of from about $-80°$ C. to about $25°$ C. and thereby forming a dispersion of high molecular weight polyformaldehyde and said reaction medium.

References Cited in the file of this patent

UNITED STATES PATENTS

| | | |
|---|---|---|
| 2,734,889 | Starr | Feb. 14, 1956 |
| 2,828,286 | MacDonald | Mar. 25, 1958 |